(12) United States Patent
Kadoshima et al.

(10) Patent No.: US 10,394,161 B2
(45) Date of Patent: Aug. 27, 2019

(54) DEVELOPING ROLL

(71) Applicant: Sumitomo Riko Company Limited, Aichi (JP)

(72) Inventors: Yutaka Kadoshima, Aichi (JP); Kosuke Minematsu, Aichi (JP); Kentaro Imai, Aichi (JP)

(73) Assignee: Sumitomo Riko Company Limited, Aichi (JP)

(*) Notice: Subject to any disclaimer, the term of this patent is extended or adjusted under 35 U.S.C. 154(b) by 0 days.

(21) Appl. No.: 16/246,557

(22) Filed: Jan. 14, 2019

(65) Prior Publication Data
US 2019/0163090 A1 May 30, 2019

Related U.S. Application Data

(63) Continuation of application No. PCT/JP2017/023081, filed on Jun. 22, 2017.

(30) Foreign Application Priority Data

Aug. 8, 2016 (JP) .................................. 2016-155796

(51) Int. Cl.
G03G 15/08 (2006.01)
C08L 27/18 (2006.01)
C08L 19/02 (2006.01)
G03G 15/02 (2006.01)

(52) U.S. Cl.
CPC .......... G03G 15/0808 (2013.01); C08L 19/02 (2013.01); C08L 27/18 (2013.01); G03G 15/0233 (2013.01); G03G 15/0818 (2013.01)

(58) Field of Classification Search
CPC .......... G03G 15/0808; G03G 15/0818; G03G 15/14; G03G 15/0233; C08L 9/02; C08L 27/12; C08L 27/18; C08L 27/20; C08L 33/12; C08L 33/10
See application file for complete search history.

(56) References Cited

U.S. PATENT DOCUMENTS

2008/0146427 A1* 6/2008 Osaku ................ G03G 15/0233
492/56
2008/0292366 A1* 11/2008 Akama .............. G03G 15/0818
399/286

FOREIGN PATENT DOCUMENTS

JP 2007225708 9/2007

OTHER PUBLICATIONS

"Written Opinion of the International Searching Authority (Form PCT/ISA/237) of PCT/JP2017/023081," dated Sep. 12, 2017, with English translation thereof, pp. 1-10.

(Continued)

Primary Examiner — Victor Verbitsky
(74) Attorney, Agent, or Firm — JCIPRNET

(57) ABSTRACT

Provided is a developing roll (R) with which it is possible to suppress toner stress in a low-temperature and low-humidity environment. A developing roll (R) for an electrophotographic device has a surface layer (1). In a surface hardness histogram (10) of the surface layer (1) measured by using an atomic force microscope (AFM), the surface hardness (H) at the top peak (P) is in the range of 10-55 MPa, and the area ratio (S) of the histogram portion corresponding to a surface hardness of 45 MPa or below in relation to the entire histogram is 65% or above.

1 Claim, 3 Drawing Sheets

(56) References Cited

OTHER PUBLICATIONS

"International Search Report (Form PCT/ISA/210) of PCT/JP2017/023081," dated Sep. 12, 2017, with English translation thereof, pp. 1-4.

* cited by examiner

DEVELOPING ROLL

CROSS REFERENCE TO RELATED APPLICATIONS

This application is a Continuation of PCT International Application No. PCT/JP2017/023081, filed on Jun. 22, 2017, which claims priority under 35 U.S.C § 119(a) to Patent Application No. 2016-155796, filed in Japan on Aug. 8, 2016, all of which are hereby expressly incorporated by reference into the present application.

BACKGROUND

Technical Field

The disclosure relates to a developing roll.

Description of Related Art

In the related art, electrophotographic devices such as electrophotographic-type copy machines, printers, and printing machines are known. Conductive rolls such as developing rolls and charging rolls are incorporated in these electrophotographic devices. As one of type of conductive roll, one that has an axial body, an elastic layer that is formed on an outer circumference of the axial body, and a surface layer that is formed on an outer circumference of the elastic layer is widely known.

In addition, Japanese Patent Application Laid-Open (JP-A) No. 2007-225708, for example, discloses an conductive roll which has at least a conductive elastic layer and a conductive surface layer on a conductive support body, in which dynamic ultrafine hardness of the surface is 0.04 or above and 0.5 or below (see JP-A No. 2007-225708).

However, the conventional conductive rolls have a problem in that use thereof in a low-temperature and low-humidity environment of 10° C.×10% RH tends to add stress to toners. Such an increase in toner stress leads to defects in images obtained by the electrophotographic devices. Such a problem is particularly significant during endurance in the low-temperature and low-humidity environment.

Specifically, in a case in which the conventional conductive rolls are applied as developing rolls, for example, hardness of the developing rolls increases, and toner stress increases in a low-temperature and low-humidity environment. As a result, toner friction on the developing rolls, shortage or burying of toner external additives and the like occur, which leads degradation of the toner and an increase in the charge amount of the toner. Then, the increase in the charge of the toner makes it difficult to form uniform toner layers on developing roll surfaces by toner layer formation blades, and defects in images due to restriction failures, such as formation of images with irregularities, tend to occur.

In the case of electrophotographic devices not using toner cleaning blades, for example, toner adhering to surfaces of charging rolls may be collected again by the developing rolls and may be reused. In a case in which the conventional conductive rolls are applied as the charging rolls to such electrophotographic devices, hardness of the charging rolls increases, and the toner stress increases in a low-temperature and low-humidity environment. As a result, shortage and burying of toner external additives, deformation of toner itself, and the like occur, which leads to degradation of the toner, and the degraded toner is mixed as a foreign matter into the collected toner. In this manner, it becomes difficult for the toner to be charged normally or to be transported appropriately, and defects in images due to restriction failures that are similar to those described above tend to occur.

SUMMARY

The disclosure was made in view of above background, and provides a developing roll capable of suppressing toner stress in a low-temperature and low-humidity environment.

According to an embodiment of the disclosure, a developing roll for an electrophotographic device is provided. The developing roll includes a surface layer, in which, in a surface hardness histogram of the surface layer measured by using an atomic force microscope, the surface hardness at the top peak is in the range of 10-55 MPa, and the area ratio of the histogram portion corresponding to a surface hardness of 45 MPa or below in relation to the entire histogram is 80% or above. The surface layer has a copolymer including, in a molecule, a first polymerization unit that is derived from (meth)acrylate that has a silicone group, a second polymerization unit that is derived from (meth)acrylate that has a fluorine-containing group, and a third polymerization unit that is derived from (meth)acrylate. A glass transition temperature Tg of a single polymer of (meth)acrylate in the third polymerization unit is 10° C. or below. The copolymer is unevenly distributed in a surface portion of the surface layer.

DESCRIPTION OF THE EMBODIMENTS

Figure 1:
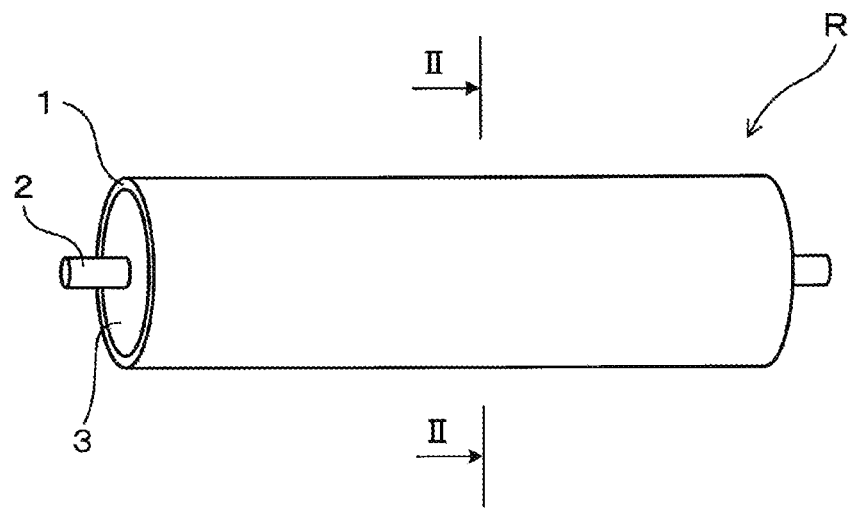
FIG. 1 is a diagram schematically illustrating a conductive roll according to Example 1.

The conductive roll is used in an electrophotographic device. As specific examples of the electrophotographic device, image formation devices such as an electrophotographic-type copying machine using charged images, a printer, a facsimile, a multifunctional machine, and an on-demand printing machine may be exemplified.

The conductive roll may be specifically a developing roll or a charging roll. In this case, it is possible to realize an electrophotographic device capable of suppressing defects in an image due to restriction failures at a low temperature and at a low humidity.

Specifically, the conductive roll has (1) a configuration that has an axial body, an elastic layer that is formed along an outer circumferential surface of the axial body, and a surface layer that is formed along an outer circumferential surface of the elastic layer, or (2) a configuration that has an axial body and a surface layer that is formed along an outer circumference of the axial body, for example.

Here, in the aforementioned conductive roll, a surface hardness histogram of a surface layer measured by using an atomic force microscope satisfies the following specific conditions. That is, in the surface hardness histogram of the surface layer, the surface hardness at the top peak is within the range of 10 to 55 MPa, and the area ratio of a histogram portion corresponding to the surface hardness of 45 MPa or below in relation to the entire histogram is 65% or above.

Note that the surface hardness histogram of the surface layer is measured by using the atomic force microscope. Specifically, "AFM5000II" manufactured by Hitachi High-Tech Science Corporation (or if this is not available due to discontinuation, an atomic force microscope capable of performing equivalent measurement) is used as the atomic force microscope. As a cantilever, "SI-DF20P2" manufactured by Hitachi High-Tech Science Corporation is used. Note that the aforementioned cantilever has a tip end radius R of 7 nm, a probe height D of 14 μm, a lever length L of 200 μm, a lever width W of 40 μm, a lever thickness T of 3.5 μm, and a spring constant of 9.000 N/m. The surface hardness histogram is obtained by cutting a measurement sample including the surface of the surface layer from the conductive roll, attaching the measurement sample to a sample table of the atomic force microscope, and measuring AFM surface hardness of the surface of the surface layer of the measurement sample. Note that the measurement sample is adjusted such that a sample base becomes stable and the surface of the surface layer in the measurement region is substantially planar. Measurement conditions are set such that a measurement room temperature is 25° C., a measurement room humidity is 70% RH, a measurement atmosphere is atmospheric air, a measurement region is 10 μm×10 μm, a torsion spring constant is 1 N/m, and a resonance frequency is 150 Hz. Note that the measurement region is selected in a uniform region with no extreme unevenness on the roll. Hardness mapping is performed by performing automatic measurement in a dynamic focus mode (DFM) and by calculating a Young's modulus from a force curve obtained by force curve/Young's modulus measurement function with a Hertz model.

The shape of the surface hardness histogram of the surface layer measured by using the atomic force microscope has a relationship with a softening state of a top surface of the surface layer in a low-temperature and low-humidity environment. In a case in which the surface hardness histogram of the surface layer satisfies the aforementioned specific conditions, the softening state of the top surface of the surface layer becomes appropriate in the low-temperature and low-humidity environment, and it is unlikely to add stress to the toner.

In the surface hardness histogram of the surface layer, the surface hardness at the top peak is preferably 11 MPa or above, is more preferably 12 MPa or above, and is further preferably 15 MPa or above from the viewpoint of ensuring suppression of the toner stress in the low-temperature and low humidity environment. In addition, the surface hardness at the top peak is preferably 53 MPa or below, is more preferably 50 MPa or below, is further preferably 45 MPa or below, and is further preferably 40 MPa or below from the viewpoint of ensuring suppression of the toner stress in the low-temperature and low-humidity environment. Note that in a case in which there is one peak in the surface hardness histogram of the surface layer, the peak corresponds to the top peak. In addition, in a case in which the surface hardness histogram of the surface layer includes a plurality of peaks, the maximum peak among the plurality of peaks corresponds to the top peak.

In the surface hardness histogram of the surface layer, the area ratio of the histogram portion with the surface hardness of 45 MPa or below in relation to the entire histogram is preferably 80% or above, is more preferably 82% or above, and is further preferably 85% or above from the viewpoint of ensuring the suppression of the toner stress in the low-temperature and low-humidity environment. Note that an upper limit of the aforementioned area ratio may be 100% or below.

The surface layer may be configured to have a copolymer including, in a molecule, a first polymerization unit that is derived from (meth)acrylate that has a silicone group, a second polymerization unit that is derived from (meth) acrylate that has a fluorine-containing group, and a third polymerization unit that is derived from (meth)acrylate. Note that in the specification, (meth)acrylate means inclusion of both acrylate and methacrylate. Similarly, (meth) acryl includes both acryl and methacryl in its meaning (this description will be omitted below). In addition, "fluorine-containing group" refers to a group containing a fluorine atom and contains —F.

With this configuration, it is possible to lower the glass transition temperature of the copolymer by changing the type of (meth)acrylate in the third polymerization unit. Therefore, it is easy to realize the surface layer that has the aforementioned surface hardness histogram and to obtain a state appropriate for the suppression of the toner stress from the softening state of the top surface of the surface layer in the low-temperature and low-humidity environment. Therefore, it becomes easier to obtain the conductive roll capable of suppressing the toner stress in the low-temperature and low-humidity environment with the aforementioned configuration. Further, with the aforementioned configuration, it becomes easy to forcibly cause the silicone group in the first polymerization unit and the fluorine-containing group in the second polymerization unit to be present in the surface of the surface layer since the copolymer includes the first polymerization unit and the second polymerization unit in addition to the third polymerization unit, and it becomes possible to improve toner adhesion resistance of the surface of the surface layer. Therefore, with the aforementioned configuration, it is possible to obtain the conductive roll capable of realizing both the suppression of the toner stress and the toner adhesion resistance in the low-temperature and low-humidity environment.

Specifically, the surface layer may be configured to include a matrix polymer and a copolymer. Specifically, the copolymer may be configured to be unevenly distributed in a surface portion of the surface layer. With this configuration, the top surface of the surface layer tends to be affected by physical properties of the copolymer. Therefore, with this configuration, it becomes easier to realize the surface layer that has the aforementioned surface hardness histogram and to obtain the conductive roll capable of suppressing the toner stress in the low-temperature and low-humidity environment by controlling the softening state of the top surface of the surface layer with the copolymer.

One kind of copolymer may be used, or two or more kinds of copolymers may be used in combination. In addition, the copolymer may contain one kind or two or more kinds of first polymerization units, one kind or two or more kinds of second polymerization units, and one kind or two or more kinds of third polymerization units.

In the first polymerization unit, (meth)acrylate that has a silicone group may have one kind or two or more kinds of silicone groups. Specifically, the silicone group may contain a polydimethylsiloxane skeleton comprised of a repetition of dimethyl siloxane units. In this case, it is possible to increase the molecular weight of the silicone group in the polydimethylsiloxane skeleton with a relatively simple molecular structure and to thereby ensure toner adhesion resistance of the surface of the surface layer.

In the second polymerization unit, (meth)acrylate that has a fluorine-containing group may have one kind or two or more kinds of fluorine-containing groups. Specifically, the fluorine-containing group may include, for example, a fluoroalkyl group, a fluoroalkyl alkylene oxide group, a fluoroalkenyl group, and —F.

As the fluorine-containing group, a fluoroalkyl group or preferably a fluoroalkyl group containing about 4 to 12 carbon atoms may be suitably used from the viewpoint of easiness in obtaining (meth)acrylate that has toner adhesion resistant fluorine-containing group and the like. The fluoroalkyl group may have all hydrogen atoms fluorinated in the alkyl group or may partially contain a nonfluorinated portion. The former is entirely fluorinated while the latter is partially fluorinated. The fluoroalkyl group is particularly preferably a perfluoroalkyl group. This is because it does not easily leave the toner attracted and it easily improves the toner adhesion resistance of the surface of the surface layer since the perfluoroalkyl group has high structural stability.

Specific examples of the fluoroalkyl group include trifluoromethyl, trifluoroethyl, trifluorobutyl, pentafluoropropyl, perfluorobutyl, perfluorohexyl, perfluorooctyl, perfluorodecyl, perfluoro-3-methylbutyl, perfluoro-5-methylhexyl, perfluoro-7-methyloctyl, octafluoropentyl, dodecafluoroheptyl, and hexadecafluorononyl.

As (meth)acrylate in the third polymerization unit, a single polymer of (meth)acrylate that has a glass transition temperature Tg of 10° C. or below may be suitably used. With this configuration, it becomes easier to lower the glass transition temperature of the copolymer. Therefore, it becomes easier to obtain a state that is advantageous for suppressing the toner stress from the softening state of the top surface of the surface layer in the low-temperature and low-humidity environment. Therefore, with the aforementioned configuration, it becomes much easier to obtain the conductive roll capable of suppressing the toner stress in the low-temperature and low-humidity environment.

(Meth)acrylate in the third polymerization unit may be checked through time-of-flight secondary ion mass spectrometry (TOF-SIMS) or thermal decomposition GC-MS analysis. In addition, a value measured by differential scanning calorimetry (DSC) is used as the aforementioned glass transition temperature Tg. Detailed description will be given with reference to experimental examples. Note that the glass transition temperature Tg of the single polymer of (meth)acrylate in the third polymerization unit is defined because it is difficult to measure the glass transition temperature of a (meth)acrylate monomer.

The aforementioned glass transition temperature Tg may preferably be 8° C. or below, may more preferably be 5° C. or below, may further preferably be 0° C. or below, and may further preferably be −5° C. or below. Note that a lower limit of the aforementioned glass transition temperature Tg may preferably be −70° C. or above, may more preferably be −68° C. or above, and may further preferably be −65° C. or above from the viewpoint of easiness in obtaining (meth)acrylate that is included in the third polymerization unit and the like.

Specific examples of (meth)acrylate in the third polymerization unit include 2-phenoxyethyl acrylate (Tg of the single polymer: 5° C.), lauryl acrylate (Tg of the single polymer: −3° C.), 2-hydroxypropyl acrylate (Tg of the single polymer: −7° C.), 2-ethylhexyl methacrylate (Tg of the single polymer: −10° C.), tetrahydrofurfuryl acrylate (Tg of the single polymer: −15° C.), phenoxypolyethylene glycol acrylate (Tg of the single polymer: −25° C.), tridecyl methacrylate (Tg of the single polymer: −40° C.), isodecyl methacrylate (Tg of the single polymer: −41° C.), isoamyl acrylate (Tg of the single polymer: −45° C.), caprolactone acrylate (Tg of the single polymer: −53° C.), isooctyl acrylate (Tg of the single polymer: −54° C.), isodecyl acrylate (Tg of the single polymer: −60° C.), and n-lauryl methacrylate (Tg of the single polymer: −65° C.). One kind may be used, or two or more kinds may be used in combination.

The copolymer may contain one kind or two or more kinds of polymerization units derived from other (meth)acrylate as needed in addition to the first polymerization unit, the second polymerization unit, and the third polymerization unit.

The copolymer may contain, in a molecule, a fourth polymerization unit that is derived from (meth)acrylate that has a hydroxyl group, for example. In this case, it becomes easy to cause the copolymer to be relatively uniformly present in the surface of the surface layer. Note that a surface modifier may contain one kind or two or more kinds of fourth polymerization units.

Specific examples of (meth)acrylate that has a hydroxyl group include methacrylic acid 2-hydroxyethyl, hydroxyethyl (meth)acrylate, hydroxypropyl (meth)acrylate, hydroxybutyl (meth)acrylate, ethylene oxide-modified (meth)acrylate, and hydroxyethyl (meth)acrylamide.

More specifically, the copolymer may be configured to include, in a molecule, the first polymerization unit that is derived from (meth)acrylate that has a silicone group including a polydimethylsiloxane skeleton, the second polymerization unit that is derived from (meth)acrylate that has a fluoroalkyl group as the fluorine-containing group, and the third polymerization unit that is derived from the aforementioned (meth)acrylate that has a glass transition temperature Tg of the single polymer of 10° C. or below. In this case, it is possible to ensure the conductive roll capable of suppressing the toner stress in the low-temperature and low-humidity environment.

The glass transition temperature Tg of the copolymer itself is preferably 5° C. or below. This is because it is possible to ensure the conductive roll capable of suppressing the toner stress in the low-temperature and low-humidity environment. Note that a value measured by a differential scanning calorimeter (DSC) is used as the glass transition temperature Tg of the copolymer. Specific description will be given later in the experimental examples.

The glass transition temperature Tg of the copolymer may preferably be 3° C. or below, may more preferably be 0° C. or below, may further preferably be −2° C., and may much more preferably be −5° C. or below from the viewpoint of further ensuring the aforementioned advantages. Note that the lower limit of the glass transition temperature Tg of the copolymer may preferably be −70° C. or above, may more preferably be −68° C. or more, and may further preferably be −65° C. or above from the viewpoint of easiness in synthesizing the copolymer and the like.

As a matrix polymer of the surface layer, various kinds of resins and rubbers (elastomer is also included among rubbers; this description will be omitted below) may be used. One kind may be used, or two or more kinds may be used in combination.

Various kinds of thermoplastic resins, mixed polymers of thermoplastic resins and thermosetting resins, and the like may be used as the above resin, for example. Specific examples of the above resin include: a urethane resin; a urethane silicone resin; a urethane fluorine resin; a polyamide resin; a polyimide resin; a (meth)acrylic resin; a (meth)acryl silicone resin; a (meth)acryl fluorine resin; a fluorine resin; an acetal resin; an alkyd resin; a polyester resin; a polyether resin; a carbonate resin; a phenol resin; an epoxy resin; a polyvinyl alcohol; polyvinylpyrrolidone; a cellulose-based resin such as carboxymethyl cellulose, hydroxyethyl cellulose, or hydroxypropyl cellulose; polyacrylamide; polyethylene oxide; polyethylene glycol; polypropylene glycol; polyvinyl methyl ether; polyamine; polyethyleneimine; casein, gelatin, starch, and copolymers thereof; an olefin-based resin such as a copolymer resin with polyethylene, polypropylene, and other olefin-based monomers; a vinyl chloride-based resin; a styrene-based resin such as polystyrene or an acrylonitrile-styrene copolymer resin; a vinyl chloride-vinyl acetate copolymer resin; a polyvinyl acetal-based resin such as a polyvinyl butyral resin and derivatives or modified products thereof; polyisobutylene; polytetrahydrofuran; polyaniline; an acrylonitrile-butadiene-styrene copolymer (ABS resin); polyisoprene, polydienes such as polybutadiene; polysiloxanes such as polydimethylsiloxane; polysulfones; polyimines; polyanhydrides; polyureas; polysulfides; polyphosphazenes; polyketones; polyphenylenes; polyhaloolefins and derivatives thereof; melamine resin; and the like. Among these examples, urethane resin, urethane silicone resin, urethane fluorine resin, and the like may be preferably used from the viewpoint of improvement in flexibility of the surface layer, improvement in wear resistance, and the like.

Specific examples of the aforementioned rubber include acrylonitrile-butadiene rubber (NBR), butadiene rubber (BR), styrene-butadiene rubber (SBR), butyl rubber (IIR), chloroprene rubber (CR), hydrin rubber (ECO, CO), isoprene rubber (IR), urethane rubber (U), silicone rubber (Q), ethylene-propylene-diene rubber (RPDM), natural rubber (NR), and modified products thereof. Among these examples, acrylonitrile-butadiene rubber (NBR), urethane rubber (U), and modified products thereof may be preferably used from the viewpoint of improvement in flexibility of the surface layer, improvement in wear resistance, and the like.

The surface layer may contain 0.1 to 20 parts by mass copolymer with respect to 100 parts by mass of matrix polymer. In this case, it becomes easy to ensure the suppression of the tone stress and improvement in the toner adhesion resistance of the surface of the surface layer in the low-temperature and low-humidity environment.

The content of the copolymer may preferably be 0.3 parts by mass or above, may more preferably be 0.5 parts by mass or more, and may further preferably be 1 part by mass or above from the viewpoint of improving the toner adhesion resistance. Also, the content of the copolymer may preferably be 18 parts by mass or below, may more preferably be 15 parts by mass or below, may further preferably be 10 parts by mass or below, may further preferably be 7 parts by mass or below, and may even more preferably be 5 parts by mass or below from the viewpoint of balance between the suppression of the toner stress and the toner adhesion resistance in the low-temperature and low-humidity environment, cost, and the like. Note that the content of the copolymer may be measured by performing thermal decomposition GC-MS analysis or NMR analysis on an extracted product obtained with extraction using a solvent, identifying a structure of the aforementioned copolymer, and then performing the thermal decomposition GC-MS analysis on the entire materials, for example.

The surface layer may contain a conductivity agent, for example, in addition to the above materials. Examples of the conductivity agent include an electronic conductivity agent, an ion conductivity agent, and a conductive polymer. Examples of the electronic conductive agent include a carbon-based conductive material, a conductive metal oxide, and metal nanoparticles. Examples of the carbon-based conductive material include carbon black, carbon nanotubes, and graphite. Examples of the conductive metal oxide include barium titanate, $c$-$TiO_2$, $c$-$ZnO$, and $c$-$SnO_2$ ($c$-indicates conductivity). Examples of the ion conductive agent include a quaternary ammonium salt, a borate, a perchlorate, and an ionic liquid. Examples of the conductive polymer include polyaniline, and polypyrrole.

In addition, the surface layer may contain various other additives such as a reaction medium, a filler (inorganic or organic), a coupling agent, a dispersant, a leveling agent, a crosslinking agent, a crosslinking aid, a plasticizer, a flame retardant, an anti-foaming agent, and roughness formation particles as needed. One kind thereof may be used, or two or more kinds thereof may be used in combination.

The thickness of the surface layer is not particularly limited and may be set to an optimal thickness in consideration of wear resistance, flexibility, and the like. The thickness of the surface layer may be set to about 1 to 100 μm, for example.

Note that the aforementioned respective configurations may be arbitrarily combined as needed in order to obtain the aforementioned respective effects and advantages.

EXAMPLES

Hereinafter, conductive rolls in the examples will be described with reference to drawings.

Example 1

Figure 2:
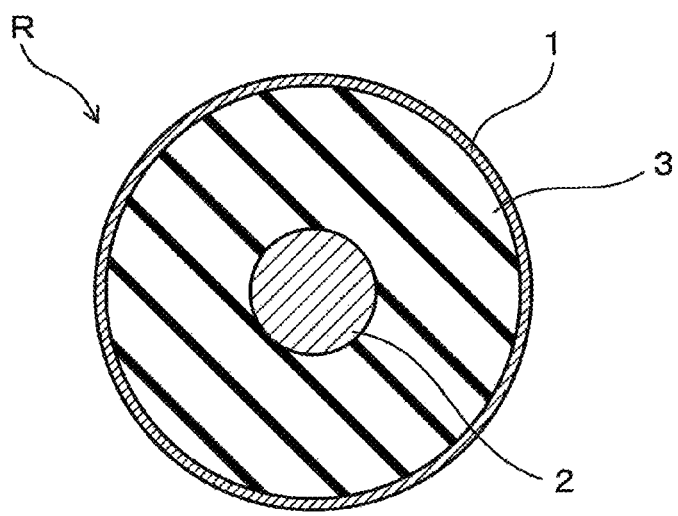
FIG. 2 is a diagram illustrating a section taken along II-II in FIG. 1.
Figure 3:
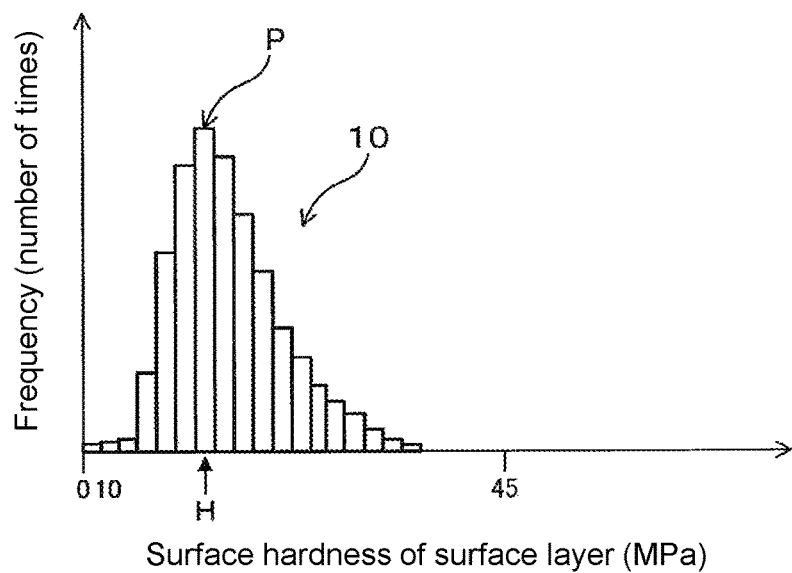
FIG. 3 is an explanatory diagram for schematically describing a surface hardness histogram of a surface layer measured by using an atomic force microscope.

A conductive roll in Example 1 will be described with reference to FIGS. 1 to 3. As illustrated in FIGS. 1 to 3, a conductive roll R in this example is used in an electrophotographic device. Specifically, the conductive roll R in the example is a developing roll or a charging roll to be incorporated in an image formation device based on an electrophotographic scheme.

The conductive roll R has a surface layer 1. Specifically, the conductive roll R in the example further has an axial body 2 and an elastic layer 3 that is formed of a rubber elastic body that is formed along an outer circumferential surface of the axial body 2 and has electric conductivity. However, both ends of the axial body 2 are in a state of protruding from both end surfaces of the elastic layer 3. In addition, the surface layer 1 is formed along an outer circumferential surface of the elastic layer 3.

Here, in a surface hardness histogram 10 of the surface layer 1 measured by using an atomic force microscope, surface hardness H at a top peak P is within a range of 10 to 55 MPa, and an area ratio S of the histogram portion with the surface hardness of 45 MPa or below in relation to the entire histogram is 65% or above.

In this example, the surface layer 1 contains a matrix polymer and a copolymer, and the copolymer is unevenly distributed in the surface portion of the surface layer. Specifically, the matrix polymer is a mixed polymer of thermoplastic polyurethane and thermosetting polyurethane. The copolymer contains, in a molecule, a first polymerization unit that is derived from (meth)acrylate that has a silicone group, a second polymerization unit that is derived from (meth)acrylate that has a fluorine-containing group, and a third polymerization unit that is derived from (meth)acrylate. The glass transition temperature Tg of the single polymer of (meth)acrylate in the third polymerization unit is 10° C. or below.

The surface layer 1 contains the copolymer within a range of 0.01 to 20 parts by mass with respect to 100 parts by mass of matrix polymer. In this example, an electronic conductivity agent for adding conductivity has further been added to the surface layer 1.

Conductive roll samples were produced and are evaluated below. The experimental example will be described.

Experimental Example

<Synthesis of Copolymer>
The following materials were prepared for synthesizing each surface modifier.

—First Polymerization Unit—
Acrylate-modified silicone compound ("X-22-174DX" manufactured by Shin-Etsu Chemical Co., Ltd.)
—Second Polymerization Unit—
2-(perfluorohexyl) ethyl acrylate ("R-1620" manufactured by Daikin Industries, Ltd.)
—Third Polymerization Unit—
2-phenoxyethyl acrylate ("SR339A" manufactured by Tomoe Engineering Co., Ltd.)
2-ethylhexyl methacrylate ("Light Ester EH" manufactured by Kyoeisha Chemical Co., Ltd.)
Isodecyl methacrylate ("SR242" manufactured by Tomoe Engineering Co., Ltd.)
Caprolactone acrylate ("SR495" manufactured by Tomoe Engineering Co., Ltd.)
n-lauryl methacrylate ("SR313" manufactured by Tomoe Engineering Co., Ltd.)
Butyl methacrylate (manufactured by Tokyo Chemical Industry Co., Ltd.)
Stearyl acrylate ("SR257" manufactured by Tomoe Engineering Co., Ltd.)
Isobutyl methacrylate ("Light Ester IB" manufactured by Kyoeisha Chemical Co., Ltd.)
Methyl methacrylate (manufactured by Junsei Chemical Co., Ltd.)
—Fourth Polymerization Unit—
Methacrylic acid 2-hydroxyethyl (Tokyo Chemical Industry Co., Ltd.)
—Polymerization Initiator—
Dimethyl 1, 1'-azobis (1-cyclohexanecarboxylate) ("VE-73" manufactured by Wako Pure Chemical Corporation)
—Solvent—
Methylisobutylketone (MIBK)
—Synthesis of Copolymers A to L—

(Meth)acrylate for forming the first polymerization unit, (meth)acrylate for forming the second polymerization unit, (meth)acrylate for forming the third polymerization unit, (meth)acrylate for forming the fourth polymerization unit, a polymerization initiator, and a synthesizing solvent that had an entire solid content of 55% were prepared at the blending rates illustrated in Tables 1 to 3 in 100 mL reaction flasks, sere subjected to bubbling with nitrogen for 5 minutes while stirred, and were polymerized for 7 hours at an inner liquid temperature of 80° C. Then, the respective solutions containing 30% of respective copolymers in solid content were obtained by adding predetermined amounts of final dilution solvents illustrated in Tables 1 to 3.

Hereinafter, preparation amounts of the respective polymerization components in synthesizing the respective copolymers and detailed configurations of the respective copolymers will be collectively shown in Tables 1 to 3. Note that "volume proportion of third polymerization unit" in Tables 1 to 3 corresponds to volume proportions (% by mass) of the third polymerization units in solids except for the polymerization initiator and solvent components in solutions containing the copolymers.

TABLE 1

| | | Copolymer | | | |
| --- | --- | --- | --- | --- | --- |
| | | A | B | C | D |
| Compounds used to form the respective polymerization units | (First polymerization unit) Acrylate-modified silicone compound | 3.08 g (0.67 mmol) | 7.31 g (1.59 mmol) | 3.08 g (0.67 mmol) | 3.08 g (0.67 mmol) |
| | (Second polymerization unit) 2-(perfluorohexyl) ethyl acrylate | 8.53 g (19.73 mmol) | 20.22 g (46.78 mmol) | 8.53 g (19.73 mmol) | 8.53 g (19.73 mmol) |
| | (Third polymerization unit) | 13.08 g (68.03 mmol) | 4.65 g (24.19 mmol) | — | — |
| | 2-phenoxyethyl acrylate | | | | |
| | 2-ethylhexyl methacrylate | — | — | 13.49 g (68.03 mmol) | — |
| | Isodecyl methacrylate | — | — | — | 15.40 g (68.03 mmol) |
| | Caprolactone acrylate | — | — | — | — |
| | n-lauryl methacrylate | — | — | — | — |
| | butyl methacrylate | — | — | — | — |
| | Stearyl acrylate | — | — | — | — |
| | Isobutyl methacrylate | — | — | — | — |
| | Methyl methacrylate | — | — | — | — |
| | (Fourth polymerization unit) Methacrylic acid 2-hydroxyl ethyl | 1.51 g (11.57 mmol) | 3.57 g (27.42 mmol) | 1.51 g (11.57 mmol) | 1.51 g (11.57 mmol) |
| | (Polymerization initiator) Dimethyl 1,1'-azobis (1-cyclohexanecarboxylate) | 1.24 g (4 mmol) | 1.24 g (4 mmol) | 1.24 g (4 mmol) | 1.24 g (4 mmol) |
| | (Solvent for synthesis: solid content of 55%) Methylisobutylketone (MIBK) | 22.44 g | 30.26 g | 22.78 g | 24.34 g |
| | (Final dilution solvent: solid content of 30%) Methylisobutylketone (MIBK) | 41.56 g | 56.04 g | 42.19 g | 45.08 g |
| Volume rate (% by mass) of third polymerization unit | | 50 | 13 | 51 | 54 |

TABLE 2

| | | Copolymer | | | |
|---|---|---|---|---|---|
| | | E | F | G | H |
| Compounds used to form the respective polymerization units | (First polymerization unit) Acrylate-modified silicone compound | 3.08 g (0.67 mmol) | 3.08 g (0.67 mmol) | 1.66 g (0.36 mmol) | 3.08 g (0.67 mmol) |
| | (Second polymerization unit) 2-(perfluorohexyl) ethyl acrylate | 8.53 g (19.73 mmol) | 8.53 g (19.73 mmol) | 5.62 g (13.00 mmol) | 8.53 g (19.73 mmol) |
| | (Third polymerization unit) | | | | |
| | 2-phenoxyethyl acrylate | — | — | — | — |
| | 2-ethylhexyl methacrylate | — | — | — | — |
| | Isodecyl methacrylate | — | — | — | — |
| | Caprolactone acrylate | 23.43 g (68.03 mmol) | — | — | — |
| | n-lauryl methacrylate | — | 17.31 g (68.03 mmol) | — | — |
| | butyl methacrylate | — | — | 12.32 g (68.03 mmol) | — |
| | Stearyl acrylate | — | — | — | 22.08 g (68.03 mmol) |
| | Isobutyl methacrylate | — | — | — | — |
| | Methyl methacrylate | — | — | — | — |
| | (Fourth polymerization unit) Methacrylic acid 2-hydroxyl ethyl | 1.51 g (11.57 mmol) | 1.51 g (11.57 mmol) | — | 1.51 g (11.57 mmol) |
| | (Polymerization initiator) Dimethyl 1,1'-azobis (1-cyclohexanecarboxylate) | 1.24 g (4 mmol) | 1.24 g (4 mmol) | 1.24 g (4 mmol) | 1.24 g (4 mmol) |
| | (Solvent for synthesis: solid content of 55%) Methylisobutylketone (MIBK) | 30.91 g | 25.91 g | 17.05 g | 29.81 g |
| | (Final dilution solvent: solid content of 30%) Methylisobutylketone (MIBK) | 57.25 g | 47.97 g | 31.57 g | 55.20 g |
| Volume rate (% by mass) of third polymerization unit | | 64 | 57 | 63 | 63 |

TABLE 3

| | | Copolymer | | | |
|---|---|---|---|---|---|
| | | I | J | K | L |
| Compounds used to form the respective polymerization units | (First polymerization unit) Acrylate-modified silicone compound | 3.08 g (0.67 mmol) | 1.66 g (0.36 mmol) | — | 1.66 g (0.36 mmol) |
| | (Second polymerization unit) 2-(perfluorohexyl) ethyl acrylate | 8.53 g (19.73 mmol) | 5.62 g (13.00 mmol) | 5.62 g (13.00 mmol) | — |
| | (Third polymerization unit) | | | | |
| | 2-phenoxyethyl acrylate | — | — | — | — |
| | 2-ethylhexyl methacrylate | — | — | — | — |
| | Isodecyl methacrylate | — | — | — | — |
| | Caprolactone acrylate | — | — | — | — |
| | n-lauryl methacrylate | — | — | — | — |
| | butyl methacrylate | — | — | — | — |
| | Stearyl acrylate | — | — | — | — |
| | Isobutyl methacrylate | 9.67 g (68.03 mmol) | — | — | — |
| | Methyl methacrylate | — | 7.37 g (73.64 mmol) | 8.71 g (87.00 mmol) | 9.98 g (99.64 mmol) |
| | (Fourth polymerization unit) Methacrylic acid 2-hydroxyl ethyl | 1.51 g (11.57 mmol) | 1.69 g (13.00 mmol) | — | — |
| | (Polymerization initiator) Dimethyl 1,1'-azobis (1-cyclohexanecarboxylate) | 1.24 g (4 mmol) | 1.24 g (4 mmol) | 1.24 g (4 mmol) | 1.24 g (4 mmol) |
| | (Solvent for synthesis: solid content of 55%) Methylisobutylketone (MIBK) | 19.66 g | 14.38 g | 12.74 g | 10.53 g |
| | (Final dilution solvent: solid content of 30%) Methylisobutylketone (MIBK) | 36.41 g | 26.63 g | 23.59 g | 19.50 g |
| Volume rate (% by mass) of third polymerization unit | | 42 | 45 | 61 | 86 |

Thermoplastic polyurethane ("Niporan 5196" manufactured by Tosoh Corporation), polyether diol (bifunctional polypropylene glycol) ("Adeka polyether P-1000" manufactured by Adeka Corporation), polyisocyanate (trimethylolpropane/hexamethylenediisocyanate trimer adduct) ("Coronate HL" manufactured by Tosoh Corporation), electronic conductivity agent (carbon black) "Ketjen EC300J" manufactured by Lion Specialty Chemicals Co., Ltd.), and the respective copolymers shown in Tables 1 to 3 were dissolved in MEK at the blending rates shown in Tables 4 and 5, which will be described later, such that the concentration of 20% by mass was achieved, and were then sufficiently mixed and dispersed by using three rolls. In this manner, the respective surface layer formation materials used to produce Conductive Roll Samples 1 to 18 and 1C to 6C were prepared.

<Measurement of Glass Transition Temperature Tg>

The glass transition temperature Tg of a single polymer (the molecular weight of 10 thousands or above) of (meth) acrylate for forming the aforementioned third polymerization unit and the glass transition temperature Tg of the synthesized copolymer were measured as follows.

Figure 4:
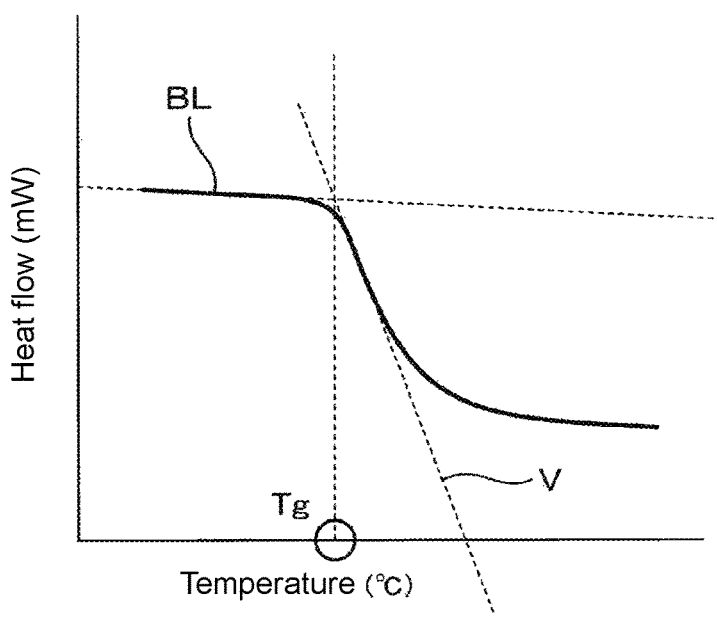
FIG. 4 is an explanatory diagram for describing a method of measuring a glass transition temperature Tg by differential scanning calorimetry (DSC).

Approximately 2 to 3 g of target material was measured and was then poured into a container such as an aluminum cup or a laboratory dish, heat treatment was performed thereon at such a temperature at which the contained solvent components were sufficiently gasified to remove the solvent, and only solid content was obtained. In the example, the heat treatment was performed at 120° C. for 60 minutes since MIBK, MEK, and the like are mainly used as the solvents. Then, the solid content was dried for 16 hours by a vacuum driver in an ordinary-temperature environment in processing before measurement using differential scanning calorimetry (DSC). Then, a heat analysis device ("Q200" manufactured by TA instruments) was used to measure the glass transition temperatures Tg of the samples under conditions of a measurement temperature of −100° C. to 150° C., a temperature rising rate of 20° C./minute, and an environment in a nitrogen atmosphere. Note that 10 mg of solid content, which has been subjected to the aforementioned processing before the measurement, was sealed in a tightly sealed pan and was used for each sample. The glass transition temperatures Tg was obtained as temperatures indicating contact points between a base line BL of a curved line and a tangent line V at an inflection point of the curved line depicted with a horizontal axis representing temperatures (° C.) and with a vertical axis representing heat flows (mW) as illustrated in FIG. 4.

<Production of Conductive Roll Samples>

Elastic layer formation materials were prepared by mixing conductive silicone rubber ("X-34-264A/B, mixed volume ratio A/B=1/1" manufactured by Shin-Etsu Chemical Co., Ltd.) with a static mixer.

Sold cylindrical iron rods with diameters of 6 mm were prepared as axial bodies, and adhesives were applied to outer circumferential surfaces thereof. The axial bodies were set in hollow spaces of molds for roll molding, and the thus prepared elastic layer formation materials were poured into the hollow spaces and were heated and cured at 190° C. for 30 minutes. In this manner, elastic layers (thicknesses of 3 mm) with roll shapes made of conducive silicone rubber were formed along the outer circumferential surfaces of the axial bodies.

Then, the thus prepared respective surface layer formation materials were applied to the outer circumferential surfaces of the aforementioned elastic layers by a roll coating method and were then heated and cured at 120° C. for 60 minutes, thereby forming surface layers (thicknesses of 10 μm). In this manner, the respective conductive roll samples with two-layered structures that have the surface layers along the outer circumferential surfaces of the aforementioned elastic layers were produced. The surface layers have mixed polymers of thermoplastic polyurethane and thermosetting polyurethane and the respective copolymers.

<Measurement of Surface Hardness Histograms of the Surface Layers Using Atomic Force Microscope (AFM)>

"AFM5000II" manufactured by Hitachi High-Tech Science Corporation was used as the atomic force microscope, thereby measuring the surface hardness histograms of the surface layers in the respective samples. Note that "SI-DF20P2" manufactured by Hitachi High-Tech Science Corporation was used as a cantilever in the measurement.

Figure 5:
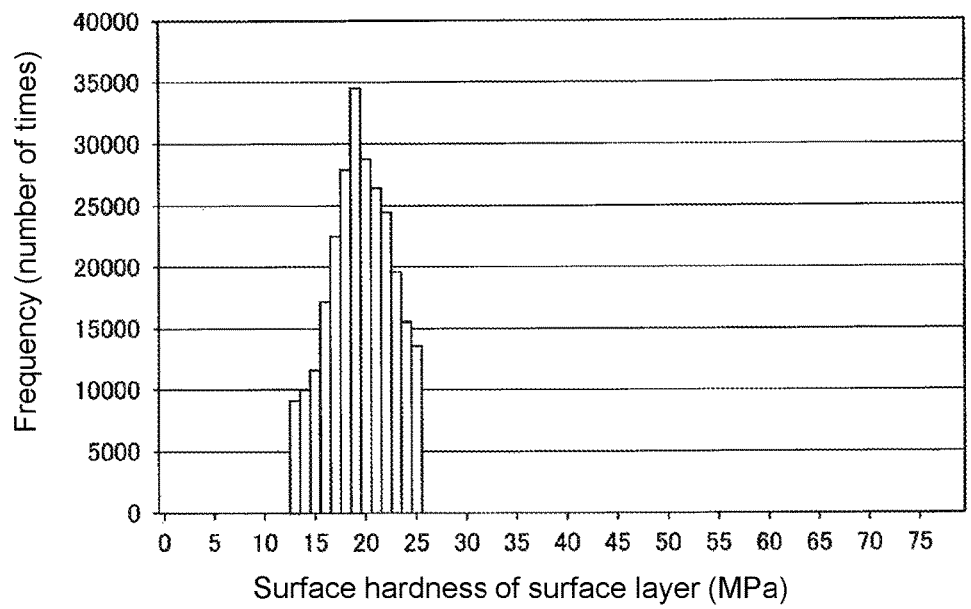
FIG. 5 is a surface hardness histogram of a surface layer of Sample 14 in experimental examples.
Figure 6:
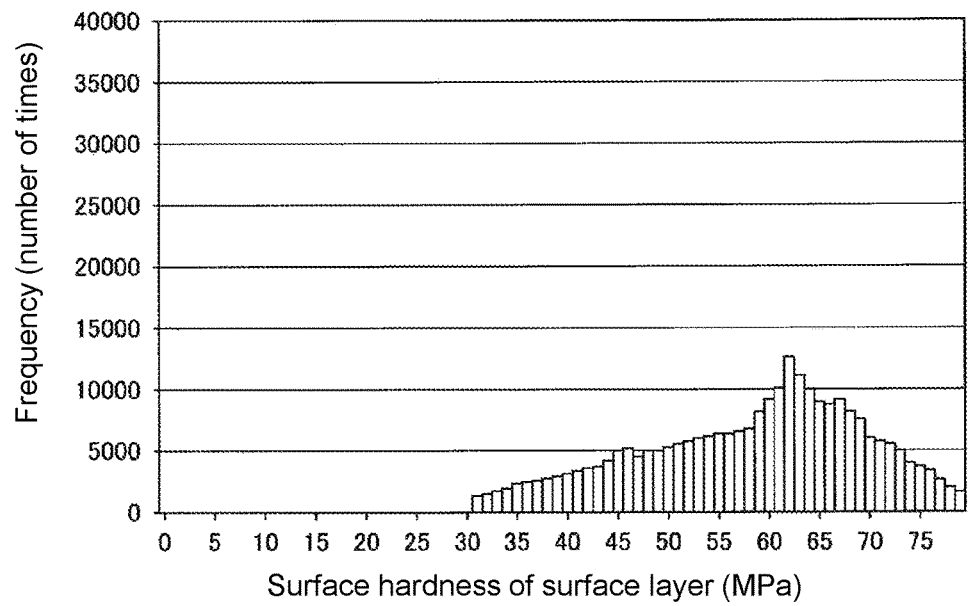
FIG. 6 is a surface hardness histogram of a surface layer of Sample 15C in experimental examples.

The respective conductive rolls were cut along axial bodies to obtain half-moon shapes in sectional views that are vertical to the axial bodies. The thus obtained measurement samples were attached to a sample platform of the atomic force microscope with the cut surfaces facing the side of the sample platform. In this manner, sample bases of the measurement samples became stable, and the surfaces of the surface layers in the measurement regions become substantially a plane. Then, the surface hardness histograms of the surface layers of the respective conductive rolls were obtained by measuring AFM surface hardness on the surfaces of the surface layers of the measurement samples. As a representative of Samples 1 to 18, a surface hardness histogram of the surface layer obtained in Sample 14 will be shown in FIG. 5. As a representative of Samples 1C to 6C, a surface hardness histogram of the surface layer obtained in Sample 5C will be shown in FIG. 6. The area ratios of the histogram portions with the surface hardness of 45 MPa or below in relation to the entire surface hardness histograms at the top peaks were obtained for the obtained respective surface hardness histograms.

Note that the measurement conditions were set such that a measurement room temperature was 25° C., a measurement room humidity was 70% RH, a measurement atmosphere was "in the atmospheric air", and a measurement region was 10 μm×10 μm. Note that an amplitude attenuation rate of −0.293, an I gain of 0.29851, and a P gain of 0.0801 were used for measurement as conditions obtained in the first measurement.

<Restriction Failures in Low-Temperature and Low-Humidity Environment>

The respective conductive rolls were incorporated as developing rolls in commercially available color printers ("Color Laser Jet Pro M252dw" manufactured by Hewlett Packard Enterprise Development LP), images of Bk concentration half-tones of 25% and 50% were output with A4 sizes in a low-temperature and low-humidity environment of 10° C.×10% RH. Note that "Laser Jet 201A MG" manufactured by Hewlett Packard Enterprise Development LP was used as a cartridge.

A case in which no blur was observed in both the 25% image and the 50% image was evaluated as "A" representing that the toner stress was able to be satisfactorily suppressed in the low-temperature and low-humidity environment since the restriction failures were satisfactorily suppressed in the low-temperature and low-humidity environment. A case in which blur was observed in one of the 25% image and the 50% image and no blur was observed in the other was evaluated as "B" representing that the toner stress was able to be suppressed in the low-temperature and low-humidity environment since the restriction failures were suppressed in the low-temperature and low-humidity environment. A case in which blur was observed in both the 25% image and the 50% image was evaluated as "C" indicating that the toner stress was not able to be suppressed in the low-temperature and low-humidity environment since the restriction failures were not suppressed in the low-temperature and low-humidity environment.

<Toner Adhesion Resistance>

The conductive rolls used for forming the images for the aforementioned restriction failure test was extracted, the distance between an air ejection port of an air gun and the surfaces of the surface layers was set to 5 cm, and the conductive rolls were rotated in the low-temperature and low-humidity environment of 10° C.×10% RH. Then, air at the pressure of 0.5 MPa was ejected from the air gun in a state in which the conductive rolls were rotated, thereby blowing the toners adhering the surfaces of the surface layers. Then, a laser microscope (Laser Microscope "VK-X100" manufactured by Keyence Corporation) was used to observe the locations, from which the toner has been blown out, at a magnification of 400 times. Then, analysis function extension module and a particle analysis module of the laser microscope were used to perform the analysis, and toner occupancies were obtained from an equation 100×(an area that the toner occupies)/(an entire surface area of the observation location) using a histogram filter function of weighing analysis. A case in which the toner occupancy was 9% or below was evaluated as "A" representing that the toner adhesion resistance was excellent. A case in which the toner occupancy was 10% or above and 29% or below was evaluated as "B" representing that the toner adhesion resistance was satisfactory. A case in which the toner occupancy was 30% or above was evaluated as "B-" representing that the toner adhesion resistance was insufficient.

Hereinafter, detailed configurations and evaluation results of the respective conductive roll samples will be collectively shown in Tables 4 and 5.

According to Tables 4 and 5, the following may be appreciated.

The surface hardness histograms of the surface layers, which were measured by using the atomic force microscope, of all the conductive rolls in Samples 1C to 6C did not satisfy the aforementioned specific conditions. Therefore, the conductive rolls in Samples 1C to 6C were not able to suppress the toner stress in the low-temperature and low-humidity environment.

In contrast, the surface hardness histograms of the surface layer, which were measured by using the atomic force microscope, of the conductive rolls in Samples 1 to 18 satisfied the aforementioned specific conditions. Therefore, it was confirmed that the conductive rolls in Samples 1 to 18

TABLE 4

| | | Sample | | | | | | | | | | | |
|---|---|---|---|---|---|---|---|---|---|---|---|---|---|
| | | 1 | 2 | 3 | 4 | 5 | 6 | 7 | 8 | 9 | 1C | 2C | 3C |
| Blending of surface layer formation materials (parts by mass) | Thermoplastic polyurethane | 10 | 10 | 10 | 10 | 10 | 10 | 10 | 10 | 10 | 10 | 10 | 10 |
| | Polyether diol | 60 | 60 | 60 | 60 | 60 | 60 | 60 | 60 | 60 | 60 | 60 | 60 |
| | Polyisocyanate | 30 | 30 | 30 | 30 | 30 | 30 | 30 | 30 | 30 | 30 | 30 | 30 |
| | Electronic conductivity agent | 3 | 3 | 3 | 3 | 3 | 3 | 3 | 3 | 3 | 3 | 3 | 3 |
| | Copolymer A | 3 | — | — | — | — | — | — | — | — | — | — | — |
| | Copolymer B | — | 3 | — | — | — | — | — | — | — | — | — | — |
| | Copolymer C | — | — | 3 | — | — | — | — | — | — | — | — | — |
| | Copolymer D | — | — | — | 3 | — | — | — | — | — | — | — | — |
| | Copolymer E | — | — | — | — | 3 | — | — | — | — | — | — | — |
| | Copolymer F | — | — | — | — | — | 3 | — | — | — | — | — | — |
| | Copolymer G | — | — | — | — | — | — | 3 | — | — | — | — | — |
| | Copolymer H | — | — | — | — | — | — | — | 3 | — | — | — | — |
| | Copolymer I | — | — | — | — | — | — | — | — | 3 | — | — | — |
| | Copolymer J | — | — | — | — | — | — | — | — | — | 3 | — | — |
| | Copolymer K | — | — | — | — | — | — | — | — | — | — | 3 | 1.5 |
| | Copolymer L | — | — | — | — | — | — | — | — | — | — | — | 1.5 |
| Single polymer Tg (° C.) of (meth) acrylate used in third polymerization unit | | 5.0 | 5.0 | −10.0 | −41.0 | −53.0 | −65.0 | 20.0 | 35.0 | 48.0 | 90.0 | 90.0 | 90.0 |
| Copolymer Tg (° C.) | | 0.0 | −2.0 | −16.0 | −43.0 | −56.0 | −60.0 | 13.0 | 20.0 | 25.0 | 49.0 | — | — |
| Surface hardness histogram of surface layer obtained by AFM | Surface hardness (MPa) at top peak | 35 | 42 | 37 | 20 | 15 | 15 | 45 | 48 | 52 | 56 | 85 | — |
| | Area ratio of histogram portion with surface hardness of 45 MPa or below in relation to entire histogram | 85 | 90 | 100 | 100 | 100 | 95 | 75 | 70 | 65 | 60 | 10 | 60 |
| Evaluation | Restriction failure in 10° C. × 10% RH environment | A | B | A | A | A | A | B | B | B | C | C | C |
| | Toner adhesion resistance in 10° C. × 10% RH environment | A | B | A | A | A | A | A | A | A | A | A | B- |

TABLE 5

| | | Sample | | | | | | | | | | | |
|---|---|---|---|---|---|---|---|---|---|---|---|---|---|
| | | 10 | 11 | 12 | 13 | 14 | 15 | 16 | 17 | 18 | 4C | 5C | 6C |
| Blending of surface layer formation materials (parts by mass) | Thermoplastic polyurethane | 20 | 20 | 20 | 20 | 20 | 20 | 20 | 20 | 20 | 20 | 20 | 20 |
| | Polyether diol | 43 | 43 | 43 | 43 | 43 | 43 | 43 | 43 | 43 | 43 | 43 | 43 |
| | Polyisocyanate | 37 | 37 | 37 | 37 | 37 | 37 | 37 | 37 | 37 | 37 | 37 | 37 |
| | Electronic conductivity agent | 25 | 25 | 25 | 25 | 25 | 25 | 25 | 25 | 25 | 25 | 25 | 25 |
| | Copolymer E | 0.2 | 0.5 | 2.0 | 4.0 | 5.0 | 10.0 | — | — | — | — | — | — |
| | copolymer J | — | — | — | — | — | — | 0.2 | 0.5 | 2.0 | 4.0 | 5.0 | 10.0 |
| Single polymer Tg (° C.) of (meth) acrylate used in third polymerization unit | | −53.0 | −53.0 | −53.0 | −53.0 | −53.0 | −53.0 | 90.0 | 90.0 | 90.0 | 90.0 | 90.0 | 90.0 |
| Copolymer Tg (° C.) | | −56.0 | −56.0 | −56.0 | −56.0 | −56.0 | −56.0 | 49.0 | 49.0 | 49.0 | 49.0 | 49.0 | 49.0 |
| Surface hardness histogram of surface layer obtained by AFM | Surface hardness (MPa) at top peak | 12 | 15 | 17 | 18 | 19 | 52 | 36 | 53 | 56 | 61 | 75 | 180 |
| | Area ratio of histogram portion with surface hardness of 45 MPa or below in relation to entire histogram | 45 | 65 | 100 | 100 | 100 | 80 | 60 | 38 | 35 | 25 | 11 | 5 |
| Evaluation | Restriction failure in 10° C. × 10% RH environment | A | A | A | A | A | B | A | B | B | C | C | C |
| | Toner adhesion resistance in 10° C. × 10% RH environment | B- | B- | B | A | A | A | B- | B- | A | A | A | A | were able to suppress the toner stress in the low-temperature and low-humidity environment of 10° C.×10% RH.

In addition, the following may be appreciated from comparison of conductive rolls of Samples 1 to 18.

It is appreciated that the suppression of the toner stress in the low-temperature and low-humidity environment may be ensured in a case in which the area ratios of the histogram portions with the surface hardness of 45 MPa or below in relation to the entire histograms are 80% or above in the surface hardness histograms.

It is appreciated that conductive rolls capable of lowering the glass transition temperatures of the copolymers by changing the types of (meth) acrylate in the third polymerization units and capable of suppressing toner stresses in the low-temperature and low-humidity environment were easily obtained in a case in which the surface layers had copolymers including, in a molecule, the first polymerization units that were derived from (meth) acrylate that had a silicone group, the second polymerization units that were derived from (meth) acrylate that had a fluorine-containing group, and the third polymerization units that were derived from (meth) acrylate. This was because it became easier to be brought into states appropriate for suppressing the toner stress from softening states of the top surfaces of the surface layers in the low-temperature and low-humidity environment by lowering the glass transition temperatures of the copolymers. Further, it was also confirmed that it becomes easier to forcibly cause the silicone groups in the first polymerization units and the fluorine-containing groups in the second polymerization units to be present in the surfaces of the surface layers by using the aforementioned copolymers and that it was also possible to improve the toner adhesion resistance of the surfaces of the surface layers.

In the aforementioned conductive roll, the surface hardness histogram of the surface layer measured by using the atomic force microscope satisfies the aforementioned specific conditions. Therefore, the aforementioned conductive roll can suppress the toner stress in a low-temperature and low-humidity environment of 10° C.×10% RH.

Although the example of the disclosure has been described above in detail, the disclosure is not limited to the aforementioned example, and various modifications may be made without departing from the gist of the disclosure.

For example, although the examples in which the produced conductive rolls are applied to developing rolls have been described above, it is also possible to apply the conductive rolls to charging rolls and to suppress restriction failures in the low-temperature and low-humidity environment.

What is claimed is:

1. A developing roll for an electrophotographic device, the developing roll comprising a surface layer,
wherein, in a surface hardness histogram of the surface layer measured by using an atomic force microscope, a surface hardness at a top peak is in the range of 10-55 MPa, and an area ratio of a histogram portion corresponding to a surface hardness of 45 MPa or below in relation to an entire histogram is 80% or above;
wherein the surface layer has a copolymer comprising, in a molecule,
a first polymerization unit that is derived from (meth) acrylate that has a silicone group, a second polymerization unit that is derived from (meth)acrylate that has a fluorine-containing group, and
a third polymerization unit that is derived from (meth) acrylate, and a glass transition temperature Tg of a single polymer of (meth)acrylate in the third polymerization unit is 10° C. or below; and
wherein the copolymer is unevenly distributed in a surface portion of the surface layer.

* * * * *